United States Patent
Yamauchi

(10) Patent No.: US 10,309,139 B2
(45) Date of Patent: Jun. 4, 2019

(54) GUIDE ROLLER FOR SLIDE DOOR OF VEHICLE

(71) Applicant: DAIDO METAL COMPANY LTD., Nagoya (JP)

(72) Inventor: Takayoshi Yamauchi, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/052,855

(22) Filed: Aug. 2, 2018

(65) Prior Publication Data

US 2019/0055766 A1 Feb. 21, 2019

(30) Foreign Application Priority Data

Aug. 17, 2017 (JP) .................. 2017-157443

(51) Int. Cl.
*E05D 15/06* (2006.01)
*B60J 5/06* (2006.01)

(52) U.S. Cl.
CPC ............. *E05D 15/0621* (2013.01); *B60J 5/06* (2013.01); *E05Y 2900/531* (2013.01); *Y10T 16/364* (2015.01)

(58) Field of Classification Search
CPC ............. E05D 15/0621; E05D 15/101; E05D 15/0643; E05D 15/0678; E05Y 2900/131; B60J 5/06; Y10T 16/364; F16C 29/045; F16C 33/12; F16C 33/121
USPC ................................. 16/91; 296/155; 384/50
See application file for complete search history.

(56) References Cited

U.S. PATENT DOCUMENTS

| | | | | |
|---|---|---|---|---|
| 3,312,015 | A * | 4/1967 | Plegat | B60J 5/062 296/155 |
| 5,809,834 | A * | 9/1998 | Goldy | B60J 5/06 296/155 |
| 2006/0010773 | A1* | 1/2006 | Nomura | E05D 15/0621 49/362 |
| 2006/0158003 | A1* | 7/2006 | Nomura | B60J 5/06 296/155 |
| 2007/0085239 | A1* | 4/2007 | Nomura | B29C 33/0077 264/299 |

(Continued)

FOREIGN PATENT DOCUMENTS

JP 6-73445 U 10/1994
JP 2006-28882 A 2/2006

(Continued)

*Primary Examiner* — William L Miller
(74) *Attorney, Agent, or Firm* — Snyder, Clark, Lesch & Chung, LLP

(57) ABSTRACT

Provided is a guide roller for a vehicular slide door. The guide roller has an annular metal inner ring; a retainer holding a bearing; an annular metal outer ring and a sliding layer including a synthetic resin. When the sliding layer is sectionalized into a sliding surface side area, an intermediate area and an interface side area, from the sliding surface to an interface with the outer ring, the synthetic resins in the sliding surface side area, the intermediate area and the interface side area have, respectively, a degree of crystallizations $X1$, $X2$ and $X3$ and nanoindenter hardnesses $Y1$, $Y2$ and $Y3$ wherein $X2-X1$ is less than 5%, and $X2-X3$ is less than 5% and wherein $Y2$ is not less than 115% of $Y1$, and $Y2$ is not less than 115% of $Y3$.

10 Claims, 3 Drawing Sheets

(56) References Cited

U.S. PATENT DOCUMENTS

| | | | |
|---|---|---|---|
| 2010/0180508 A1* | 7/2010 | Yamaguchi | B60J 5/06 49/358 |
| 2013/0154305 A1* | 6/2013 | Thiele | B60J 5/06 296/155 |
| 2017/0268271 A1* | 9/2017 | Urano | E05F 15/657 |
| 2019/0032713 A1* | 1/2019 | Kunishima | F16C 33/12 |
| 2019/0032715 A1* | 1/2019 | Kunishima | B60J 5/06 |

FOREIGN PATENT DOCUMENTS

| | | | | |
|---|---|---|---|---|
| JP | 2006-328791 A | | 12/2006 | |
| JP | 2007-106004 A | | 4/2007 | |
| JP | 2008297716 A | * | 12/2008 | |
| JP | 2009102868 A | * | 5/2009 | F16C 13/006 |

* cited by examiner

GUIDE ROLLER FOR SLIDE DOOR OF VEHICLE

FIELD OF THE INVENTION

The present invention relates to a guide roller including a sliding layer including synthetic resin. In particular, the invention relates to a guide roller for a slide door of a vehicle, configured to be rotatably supported by a support member attached to the slide door and roll and move along a rail on a vehicle body.

RELATED ART

For a vehicular slide door, an upper guide roller is attached to an upper position of a front end of the slide door, a center guide roller is attached to a middle height position of a rear end of the slide door, and a lower guide roller is attached to a lower position of the front end of the slide door. In a vehicle body, an upper rail is located at an upper edge of an opening of a vehicle body, a center rail is located at a middle height position of a rear sidewall of the vehicle body adjacent to the opening, and a lower rail is located at a lower edge of the opening. The upper guide roller, the center guide roller, and the lower guide roller are respectively rotatably engaged with the upper rail, the center rail and the lower rail. Thus, the slide door of the vehicle is supported slidably along a sidewall of a vehicle body. Thereby, the slide door can be slidably opened and closed. The guide rollers roll and move along the guide rails on the vehicle body.

The guide rollers includes: an inner ring made of a metal; an outer ring made of a metal and rotatably held on the inner ring via a retainer which holds a bearing; and a sliding layer of synthetic resin and coating an outer circumferential surface of the outer ring. This structure avoids direct contact between the metal guide rail and the metal outer ring. The sliding layer contacts with the guide rail while rolling, thereby improving silence at a time of opening and closing of the door.

At a front end of an upper edge of the slide door, a guide roller is caulked and secured to a tip of an arm member (support member), and is held movably while rotating in a horizontal direction in the rail. However, the arm member possibly rocks and a support shaft tilts. In the case, the guide roller rolls while remaining tilted (see FIG. 3 of JP 2006-328791 A) and it is likely to occur that the sliding layer made of resin is damaged. In this regard, JP 2006-328791 A, JP 2006-28882 A and JP 2007-106004 A disclose that the guide roller includes a protruding portion integrally formed at an upper end of an outer circumferential surface of the annular outer ring and protruding from the upper end surface of the outer ring. Such a guide roller is advantageously since the protruding portion (flange portion) prevents the guide roller from falling off the guide rail even if the resin sliding layer is damaged.

On the other hand, JP 6-73445 U discloses a rolling bearing adapted to improve a bonding force of a coating member. In the rolling bearing, restricting grooves are formed in an outer circumferential surface and a side surface of the outer ring and the coating member is bonded to the outer ring so as to cover the outer circumferential surface and the side surface.

SUMMARY OF THE INVENTION

As described above, the guide roller possibly rolls while tilted when the arm member rocks and a support shaft tilts. In the case, an upper edge of the resin sliding layer contacts with the guide rail, and thus the guide roll rolls under a local load. As a result, the synthetic resin of the sliding layer, which contacts the guide rail, is drawn by the guide rail, leading to an increase in elastic deformation of the synthetic resin in a direction of the sliding. Consequently, damage such as cracking may occur on the surface of the sliding layer. In a worse case, the sliding layer may fall off the outer ring, or adhesion between the outer ring and the sliding layer may be weakened to peel off the sliding layer from the outer ring. Even though the guide roller is structured such that the flange portion is integrally formed on the outer ring, for example, as disclosed in JP 2006-328791 A, JP 2006-28882 A and JP 2007-106004 A, the upper edge of the sliding layer is subjected to a local load when the guide roller is rolled while tilted. Then, the load is transmitted to the inside of the sliding layer. When the load reaches an interface between the sliding layer and the outer ring, fall-off or peel-off of the sliding layer may result.

Therefore, an object of the present invention is to overcome the above problems of the conventional guide rollers and to provide a guide roller for a slide door of a vehicle, that is hardly subjected to damage such as cracking on the surface of the sliding layer and that is capable of preventing fall-off and peel-off of the sliding layer.

According to an aspect of the present invention, provided is a guide roller for a slide door of a vehicle. The guide roller is configured to be rotatably supported by a support member attached to the slide door of the vehicle, and to roll and move along a rail on a vehicle body. The guide roller includes an annular inner ring made of a metal and attached to the support member; a retainer holding a bearing; an annular outer ring made of a metal and rotatably held by the inner ring via the retainer; and a sliding layer coating on an outer circumferential surface of the outer ring. The sliding layer includes a synthetic resin, and has a thickness and an outer circumferential surface acting as a sliding surface.

When the sliding area is sectionalized into a sliding surface side area, an intermediate area and an interface side area, where the sliding surface side area is defined as an area extending from the sliding surface of the sliding layer toward an interface between the sliding layer and an outer circumferential surface of the outer ring and having a thickness of 25% of the sliding layer thickness; the interface side area is defined as an area extending from the interface toward the sliding surface and having a thickness of 25% of the sliding layer thickness; and the intermediate area is defined as an area between the sliding surface side area and the interface side area. The synthetic resin in the sliding surface side area has a crystallinity $X_1$, the synthetic resin in the intermediate area has a crystallinity $X_2$, and the synthetic resin in the interface side area has a crystallinity $X_3$, where $X_2-X_1$ is less than 5%, and $X_2-X_3$ is less than 5%. Furthermore, the synthetic resin in the sliding surface side area has a nanoindenter hardness $Y_1$, the synthetic resin in the intermediate area is defined to have a nanoindenter hardness $Y_2$, and the synthetic resin in the interface side area has a nanoindenter harness $Y_3$, where $Y_2$ is not less than 115% of $Y_1$, and $Y_2$ is not less than 115% of $Y_3$.

According to a preferred embodiment of the present invention, $X_1$ is from 20% to less than 90%, and $X_2$ is from 20% to less than 90%, and $X_3$ is from 20% to less than 90%.

According to a preferred embodiment of the present invention, a value of $X_2-X_1$ is less than 3%, and a value of $X_2-X_3$ is less than 3%.

According to an embodiment of the present invention, the synthetic resin is preferably one or more selected from a group consisting of nylon, polyacetal, polyphenylene sulfide, polyether imide, and polyethylene.

According to an embodiment of the present invention, the sliding layer preferably further includes fibrous particles dispersed in the synthetic resin, and the fibrous particles are preferably one or more selected from a group consisting of glass fibrous particles, ceramic fibrous particles, carbon fibrous particles, aramid fibrous particles, acrylic fibrous particles, and polyvinyl alcohol fibrous particles.

According to a preferred embodiment of the present invention, the sliding layer preferably further includes one or more solid lubricants selected from a group consisting of graphite, molybdenum disulfide, tungsten disulfide, boron nitride, and polytetrafluoroethylene.

According to an embodiment of the present invention, the sliding layer preferably further includes 1 to 10 volume % of one or more fillers selected from $CaF_2$, $CaCo_3$, talc, mica, mullite, iron oxide, calcium phosphate, potassium titanate, and $Mo_2C$ (molybdenum carbide).

According to an embodiment of the present invention, the outer circumferential surface of the outer ring is preferably uneven at an interface with the sliding layer.

According to an embodiment of the present invention, the outer ring preferably includes a flange portion protruding outward radially from the outer circumferential surface at an interface with the sliding layer.

DESCRIPTION OF THE EMBODIMENT

For a slide door of a vehicle, as described above, an upper guide roller is attached to an upper position of a front end of the slide door, a center guide roller is attached to a middle height position of a rear end of the slide door, and a lower guide roller is attached to a lower position of the front end of the slide door. An upper rail is located at an upper edge of an opening of a vehicle body, a center rail is located at a middle height position of a rear sidewall of the vehicle body adjacent to the opening, and a lower rail is located at a lower edge of the opening. The upper guide roller, the center guide roller, and the lower guide roller are respectively rotatably engaged with the upper rail, the center rail and the lower rail. Thus, the slide door of the vehicle is supported slidably along a sidewall of a vehicle body and slidably opened and closed.

Figure 1:
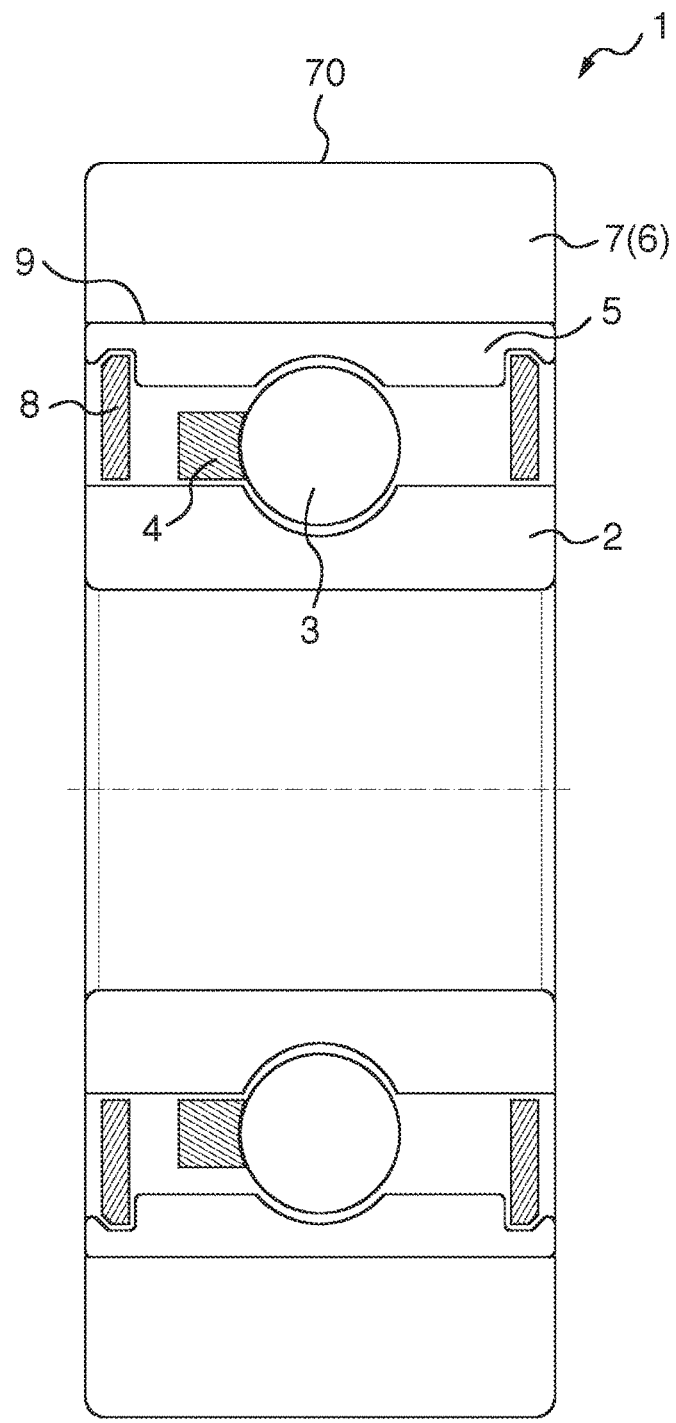
FIG. 1 is a view depicting a cross section of a guide roller according to an embodiment of the present invention.

FIG. 1 schematically depicts a cross section of a guide roller 1 according to the present invention. The guide roller 1 has an annular inner ring 2 made of a metal, a retainer 4 holding a plurality of bearings 3, an annular outer ring 5 made of a metal and rotatably held by the inner ring 2 via the retainer 4, a sliding layer 7 including synthetic resin coating an outer circumferential surface of the outer ring 5, and a seal ring 8 sealing between the outer ring 5 and the inner ring 2. The seal ring 8 has a function to seal between the outer ring 5 and the inner ring 2 to prevent contamination of foreign substances, as well as prevent leakage of grease in the guide roller 1.

The inner ring 2 is fixed to a support member (not shown) connected to the slide door of the vehicle. Thereby, the outer ring 5 and the sliding layer 7 can rotate around an axis of the support member or the guide roller 1 with respect to the support member and the inner ring 2. Herein, a term "axial direction" refers to a direction parallel to the axis of the support member or the guide roller 1, and a term "radial direction" refers to a direction perpendicular to the axis. A term "inner circumferential surface" refers to a surface of an annular member, which is closer to the axis. A term "outer circumferential surface" refers to a surface of the annular member, which is away from the axis.

By way of example, the guide roller 1 may have following dimensions: the guide roller 1 has an outer diameter (diameter) of 15 to 23 mm; the outer circumferential surface of the outer ring 5 has an outer diameter (diameter) of 10 to 20 mm; and the guide roller 1 has an axial width of 5 to 10 mm. Please note that the guide roller 1 according to the present invention is not limited to these dimensions.

Figure 2:
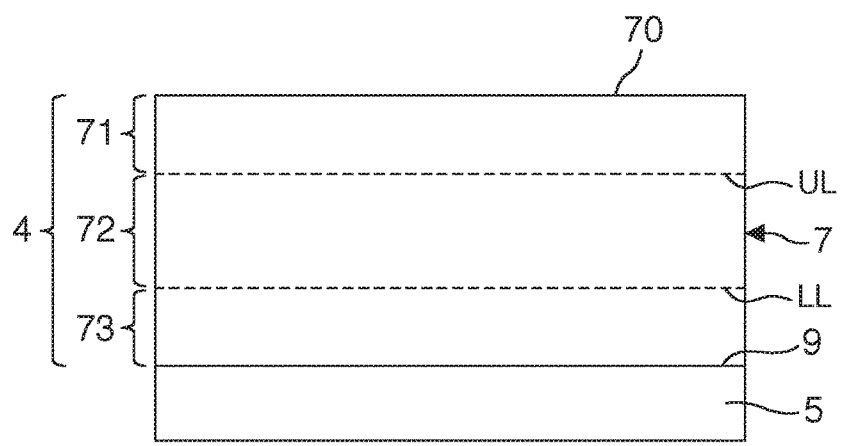
FIG. 2 is a view depicting a cross section of a sliding layer according to the present invention.

FIG. 2 schematically depicts a cross section of the sliding layer 7 of the guide roller 1 according to the present invention. The cross section is taken in a direction perpendicular to a sliding surface 70. In the guide roller 1, the sliding layer 7 including a synthetic resin 6 is formed on the outer circumferential surface of the outer ring 5. An outer circumferential surface of the sliding layer 7 (i.e., a surface opposite to the outer circumferential surface of the outer ring 5) functions as a sliding surface 70 of the guide roller 1.

Preferably, the synthetic resin 6 is one or more selected from nylon, polyacetal, polyphenylene sulfide, polyethylene, and polyether imide.

The sliding layer 7 may further include fibrous particles dispersed in the synthetic resin 6. The fibrous particles are preferably one or more selected from glass fibrous particles, ceramic fibrous particles, carbon fibrous particles, aramid fibrous particles, acrylic fibrous particles, and polyvinyl alcohol fibrous particles. The fibrous particles can improve a strength of the sliding layer. An amount of the fibrous particles is preferably 5 to 10%.

The sliding layer 7 may further include one or more solid lubricants selected from graphite, molybdenum disulfide, tungsten disulfide, boron nitride, and polytetrafluoroethylene. The solid lubricant/lubricants can improve sliding properties of the sliding layer 7. An amount of the solid lubricant/lubricants is preferably 5 to 10%.

The sliding layer 7 may further include 1 to 10 volume % of one or more fillers selected from $CaF_2$, $CaCo_3$, talc, mica, mullite, iron oxide, calcium phosphate, potassium titanate, and $Mo_2C$ (molybdenum carbide). The filler/fillers can improve abrasion resistance of the sliding layer.

The inner ring 2 and the outer ring 5 may be made of an Fe alloy such as a bearing steel (SUJ-2). Raceway portions of the inner ring 2 and the outer ring 5 may be induction-hardened to improve resistant to friction abrasion while it is easily caulk-fixed to the support member (not shown).

The sliding layer 7 preferably has a thickness of 0.5 to 6 mm (The thickness is a distance, in a direction perpendicular to the sliding surface 70, from the sliding surface 70 to an interface 9 between the sliding layer 7 and the outer ring 5.)

The thickness of the sliding layer 7 is denoted as "T", and the sliding layer 7 is sectionalized into a "sliding surface side area 71" extending from the sliding surface 70 of the sliding layer 7 toward the interface 9 by a distance of 25% of the thickness T, an "interface side area 73" extending from the interface 9 toward the sliding surface 70 by a distance of 25% of the thickness T, and an "intermediate area 72" positioned between the "sliding surface side area 71" and the "interface side area 73".

When the synthetic resin in the sliding surface side area 71 is defined to have a degree of crystallization X1, the synthetic resin in the intermediate area 72 is defined to have a degree of crystallization X2, and the synthetic resin in the interface side area 73 is defined to have a degree of crystallization X3, the sliding layer 7 satisfies following relationships:

X2−X1 is less than 5%; and
X2−X3 is less than 5%.

Furthermore, when the synthetic resin in the sliding surface side area has a nanoindenter hardness Y1, the synthetic resin in the intermediate area has a nanoindenter hardness Y2, and the synthetic resin in the interface side area has a nanoindenter hardness Y3, following relationships are satisfied:

Y2 is not less than 115% of Y1; and
Y2 is not less than 115% of Y3.

Since the degree of crystallization X2 of the synthetic resin in the intermediate area 72 is different from the degree of crystallization X1 of the synthetic resin in the sliding surface side area 71 and the degree of crystallization X3 of the synthetic resin in the interface side area 73 by less than 5%, there is not substantially difference therebetween. If the degree of crystallization may be different by not less than 5%, the synthetic resins deform with different rates between the sliding surface side area and the interface side area when a load is applied from the guide rail members. Thus, fine cracking is likely to occur at the interface or boundary between the areas. The fine cracking is likely to act as a starting point to generate cracking and abrasion of the sliding surface.

The nanoindenter hardness Y2 of the synthetic resin in the intermediate area 72 is higher than the nanoindenter hardness Y1 of the synthetic resin in the sliding surface side area 71 and the nanoindenter hardness Y3 of the synthetic resin in the interface side area 73. That is, Y2 is not less than 115% of Y1 and Y3.

An absolute value of the nanoindenter hardness is not particularly limited. However, for example, the nanoindenter hardness Y2 is preferably in a range of 7.5 to 10.5 (MPa) when the synthetic resin in the intermediate area is made of nylon (PA66). When the synthetic resin in the intermediate area is made of polyacetal (POM), Y2 is preferably in a range of 7.5 to 10.5 (MPa). When the synthetic resin in the intermediate area is made of polyethylene (PE), Y2 is preferably in a range of 3.5 to 6.5 (MPa).

If the arm member rocks resulting in tilt of a supporting axis, the guide roller 1 is rolled while being tilted and is subjected to a local load at a contacting portion between the guide rail members and the sliding surface 70 of the sliding layer 7 in the vicinity of an axial end of the outer ring 5. Even in the case, since the synthetic resin has the same degree of crystallization throughout the sliding layer, fine cracking is suppressed in the vicinity of the interface or boundary between the sliding surface side area and the intermediate area since the synthetic resin is deformed at the same rate in the both areas. This in turn prevents cracking in the sliding surface 70 that may develop from the fine cracking. On the other hand, even if an excessive load is applied from the guide rail members to the sliding layer 7, cracking of the sliding surface can be suppressed since the nanoindenter hardness Y1 of the synthetic resin in the sliding surface side area 71 is lower than the nanoindenter hardness Y2 of the synthetic resin in the intermediate area 72, thus allowing the synthetic resin in the sliding surface side area 71 to deform sufficiently even when the guide roller 1 is subjected to an excessive local load. Furthermore, the high hardness of the intermediate area 72 prevents that deformation of the sliding surface side area propagates to the vicinity of the interface 9 between the interface side area 73 and the outer ring 5. Consequently, this prevents shearing of the synthetic resin from the outer ring 5 in the vicinity of the interface between the interface side area 73 and the outer circumferential surface (interface 9) of the outer ring 5.

As the above mechanism, the guide roller 1 according to the present invention is prevented from damage such as cracking on the surface of the sliding layer 7 and further from shearing of the sliding layer 7 from the outer ring 5, even in a situation where the guide roller 1 is rolled while being tilted as a result of tilt of the support shaft caused by rocking of the arm member, and is thus applied with a local load to the sliding surface 70 of the sliding layer 7.

In the present invention, preferably, X1 is not less than 20% but less than 90%; X2 is not less than 20% but less than 90%; and X3 is not less than 20% but less than 90%.

More preferably, X2−X1 is less than 3%, and X2−X3 is less than 3%. When a difference of the degree of crystallization is less than 3%, the above effect is further more improved than the case where the difference is less than 5%.

In a conventional guide roller, unlike the above configuration of the present invention, the synthetic resin in the sliding surface side area and interface side area of the sliding layer has a lower degree of crystallization and a lower nanoindenter hardness than the synthetic resin in the intermediate area. If the guide roller is rolled while being tilted as a result of tilt of the support shaft caused by rocking of the arm member and the guide roller 1 is subjected to a local load from the guide rail members, fine cracking is likely to occur at the interface (boundary) between the sliding surface side area and the intermediate area due to a difference in the deformation rate of the synthetic resin between the areas. The fine cracking may leads cracking in the sliding surface and abrasion thereof.

Furthermore, the synthetic resin in the vicinity of the surface of the sliding layer, which contacts the surface of the guide rail member, has a low hardness and is thus likely to be deformed. Consequently, the synthetic resin in this area is dragged by the surface of the guide rail member, and the surface of the sliding layer is likely to be subjected to damage such as fine cracking and to be worn.

Furthermore, in some conventional guide rollers, the synthetic resin has the same degree of crystallization and the same nanoindenter hardness throughout the sliding layer. However, in this case, a load applied to the surface of the sliding layer by the guide rail member is transmitted to the interface between the sliding layer and the outer ring. Then, a shearing force is generated due to a difference in elastic deformation between the metal outer ring made and the synthetic resin in the sliding layer, causing shearing between the outer ring and the sliding layer. A small shearing is likely to lead to macroscopic shearing or peeling-off.

While the outer circumferential surface of the outer ring 5 is shown as smooth in FIG. 1 the outer circumferential surface of the outer ring 5 is not limited to the shape. The outer ring 5e may have an irregular or uneven surface as depicted in FIG. 4B of JP 2007-106004 A. The irregular or uneven surface of the outer ring 5 is capable of improving a bonding strength between the sliding layer and the outer ring.

Figure 3:
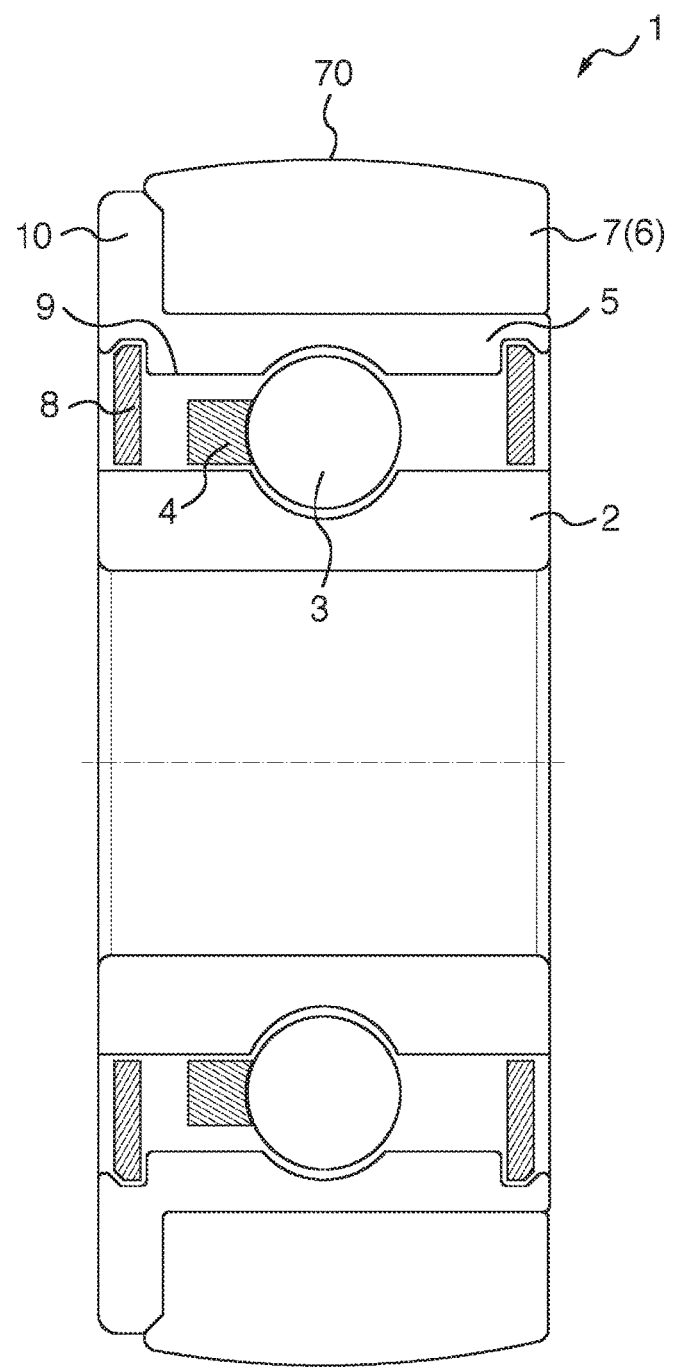
FIG. 3 is a view depicting a cross section of a guide roller according to further embodiment of the present invention.

FIG. 3 schematically depicts a cross section of a second embodiment of the guide roller 1 according to the present invention. This second embodiment is different from the first embodiment of FIG. 1 as follows:

A flange portion 10 protrudes outward in a radial direction from an entire circumference of the outer ring 5 at an end of the outer ring 5 in an axial direction; and The sliding surface 70 of the sliding layer 7 in FIG. 3 is shaped generally protruding curved with a vicinity of a center protruding most outward in the radial direction while the sliding surface 70 of the sliding layer 7 in FIG. 1 is generally flat except both axial ends. Other configurations in FIG. 3 are same as those of FIG. 1 and have similar effects.

A process of manufacturing the guide roller will be described below in detail.

(1) An outer ring, an inner ring, and bearings pre-processed into respective predetermined shapes are prepared. The inner ring and the outer ring may be produced from an Fe alloy such as a bearing steel (SUJ-2). Raceway portions of the inner ring and the outer ring are induction-hardened so that they can be resistant to friction against the bearings and thus to abrasion as well as they can be easily caulked to a support shaft (not shown).

(2) Preparation of Synthetic Resin Material Particles

A material for the synthetic resin may be one or more selected from nylon, polyacetal, polyphenylene sulfide, polyethylene and polyether imide. Optionally, fibrous particles of the synthetic resin may be dispersed. In the case, a material for the fibrous particles may be, e.g., artificially produced inorganic fibrous particles (e.g., glass fibrous particles or ceramic fibrous particles) or organic fibrous particles (e.g., carbon fibrous particles, aramid fibers, acrylic fibrous particles, or polyvinyl alcohol fibrous particles).

(3) Production of Sliding Layer

The sliding layer is coated on an outer circumferential surface of the outer ring with the above material or the like, through steps of "mold clamping", "injection", and a "cooling", with use of an injection molding machine.

"Melt Kneading"

Synthetic resin particles and other material, if any (e.g., a fibrous particles material, a solid lubricant, or a filler) are charged into a cylinder through a hopper. An inside of the cylinder is heated at 190 to 300° C. and a screw is rotated in the cylinder to melt and knead the materials. Thus, a predetermined amount (the amount needed for the product) of resin is stored in front of the screw in the cylinder.

"Supply (Injection)"

An amount of synthetic resin is extruded by the screw and is supplied to (injected into) a mold so as to cover the outer circumferential surface of the preset outer ring. At this time, the synthetic resin is supplied (injected) at a high injection pressure of 100 to 120 MPa. After the mold is filled with the resin, dwell pressure control is performed at a pressure of 30 to 70 MPa. Molten resin is supplied to the mold via a sprue, a runner, and a gate. The gate used here is a film gate.

"Cooling"

A temperature of the mold is set lower than the temperature in the cylinder by approximately 75 to 175° C. (the temperature of the mold is set to 125 to 135° C.), and the synthetic resin is cooled for a longer time of 60 to 70 seconds. A cooling fluid passage is formed inside a wall of the mold for cooling of the synthetic resin. A viscosity of the molten synthetic resin supplied to (injected into) the mold by the screw is gradually increased by the cooling and the resin starts to solidify. Then, the outer circumferential surface is covered with the synthetic resin and the finished outer ring is taken out. An exemplary thickness of the synthetic resin from the sliding surface to the outer ring is 0.5 to 6 mm.

(4) Assembling

The outer ring coated with the sliding layer is assembled to the annular inner ring via a retainer holding a plurality of bearings such that the outer ring is rotatable, and the outer ring and the inner ring are sealed with a seal ring. Thus, the guide roller is produced.

(5) Structure Control (Control of Degree of Crystallization)

Now, a method for controlling the degree of crystallization of the synthetic resin in the sliding layer will be described. The degree of crystallization is defined for a crystalline resin and refers to a ratio of a crystallized portion to an entire resin. It is said that the crystalline resin is in a state where polymer chains are regularly arrayed in the resin (crystalline state). However, in actuality, the crystalline state and un-crystalline state are mixed. In the un-crystalline state, polymer chains are shaped like yarn balls or entangled with one another. For the crystalline resin, the ratio of the crystalline state is generally defined as a degree of crystallization. Generally, the crystalline resin has a reduced degree of crystallization when quenched from a molten state, while it has an increased degree of crystallization when cooled slowly from the molten state.

In order to control the degree of crystallization, a mold temperature is set higher and a cooling time is set longer than those of the conventional process, during the cooling step in the producing process of the sliding layer of the guide roller. Specifically, the mold temperature is set approximately 75 to 175° C. lower than that in the cylinder (the mold temperature is set to 125 to 135° C.), and the cooling time is long, for 60 to 70 seconds. In the conventional process, the mold temperature is set approximately 140 to 250° C. lower than that in the cylinder (the mold temperature is set to 50 to 60° C.), and the cooling time is a shorter, for 15 to 25 seconds.

When the molten resin is supplied into the mold, the resin starts to be solidified. Since the mold temperature is higher and the cooling time is longer in the process of the present invention, the synthetic resin in the vicinity of a sliding layer surface initially contacting a wall of the supply mold is slowly cooled from the high temperature. In a central portion of the sliding layer, the synthetic resin is cooled from the high temperature for a longer time period, thus slowly cooled like the vicinity of an upper and lower surfaces of the sliding layer. Consequently, the degree of crystallization of the synthetic resin in the central portion (on the outer circumferential surface portion of the outer ring) and the degree of crystallization in the vicinity of the surfaces are substantially same to each other.

In the conventional process, since the mold temperature is set at approximately 125 to 290° C. lower than the temperature in the cylinder (the mold temperature is set at 50 to 60° C.) and the cooling time is set shorter, as 15 to 25 seconds, the resin in the vicinity of the surfaces in contact with the mold wall is quenched, and the resin in the central portion is slowly cooled. Consequently, the degree of crystallization is higher in the central portion than in the vicinity of the surface of the outer circumferential surface portion of the outer ring (see Comparative Example 13 in Examples).

(Control of Nanoindenter Hardness)

The nanoindenter hardness is controlled by a gate structure at a film gate in the "injection" step of the process of producing the sliding layer of the guide roller. The film gate is typically applied to produce thin products such as films, which supplies or injects in one direction along a width of a mold. Since the molten resin is supplied to or injected into the mold in one direction, the resin flowing in the central portion does not contact the mold wall and thus is easily oriented in comparison to the resin flowing in contact with the mold wall and the outer ring surface (which is likely to generate disturbance). Thus, the synthetic resin in the central portion (on the outer circumferential surface portion of the outer ring) of the guide roller has a higher nanoindenter hardness than the synthetic resin in the vicinity of the sliding surface and in the vicinity of the outer ring surface. The orientation of the resin refers to an anisotropic array of molecules of the synthetic resin with respect to the direction of injection.

In the conventional process, for example, a three-point gate is adopted taking productivity into account, and thus, flows of the resin flowing through the gates collide against one another in the mold. Consequently, in the sliding layer, the flows of the resin are isotropically oriented at the position of the collision to generate brittle weld lines extending in a direction parallel to the thickness direction of the sliding surface. If a local load is applied to the brittle weld lines, the weld lines are likely to act as starting points of cracking of the surface of the sliding layer and wear is likely to occur.

(6) Measurement of Degree of Crystallization

The degree of crystallization of the synthetic resin was determined with use of a differential scanning calorimeter (DSC). An exothermic peak calorific value resulting from crystallization of the synthetic resin and an endothermic peak calorific value resulting from crystal melting were measured, and the degree of crystallization was calculated by the following Equation (1). In the equation, a "100% crystal melting endothermic peak calorific value" refers to the endothermic peak calorific value when the synthetic resin is assumed to be in a 100% crystal state.

Degree of crystallization (%)=[(endothermic peak calorific value J/g resulting from crystal melting)−(exothermic peak calorific value J/g resulting from crystallization)]/(100% crystal melting endothermic peak calorific value J/g)×100     (1)

(7) Measurement of Ratio of Nanoindenter Hardness

A nanoindenter hardness (MPa) ratio of the synthetic resin was measured with use of a nanoindenter in conditions that a testing force was set to 1 mN and a time period for reaching the testing force, a retention time period, and an unloading time period were each set to 10 seconds. A regular-triangular-pyramidal Berkovich indenter with a tip made of diamond was pressed into each of the areas of the synthetic resin down to an indentation depth of 1 μm. Five points of the hardness (MPa) was measured by pressing the indenter, to determine the hardness ratio. Then, an average value was calculated.

Examples

Examples 1 to 10 of the guide roller according to the invention and Comparative Examples 11 to 13 were produced as follows. Table 1 shows compositions of sliding layers in Examples and Comparative Examples.

TABLE 1

| Sample | | PA66 | POM | PE | glass fiber | Gr | CaF2 | sliding surface side area X1 | intermediate area X2 | interface side area X3 |
|---|---|---|---|---|---|---|---|---|---|---|
| Example of the invention | 1 | 100 | — | — | — | — | — | 43 | 47 | 43 |
| | 2 | — | 100 | — | — | — | — | 64 | 68 | 64 |
| | 3 | — | — | 100 | — | — | — | 89 | 85 | 89 |
| | 4 | 100 | — | — | — | — | — | 47 | 49 | 48 |
| | 5 | — | 100 | — | — | — | — | 65 | 67 | 66 |
| | 6 | — | — | 100 | — | — | — | 89 | 88 | 90 |
| | 7 | 92.5 | — | — | 7.5 | — | — | 47 | 48 | 47 |
| | 8 | 85 | — | — | 7.5 | 7.5 | — | 45 | 47 | 46 |
| | 9 | 77.5 | — | — | 10 | 5 | 7.5 | 47 | 49 | 47 |
| | 10 | 100 | — | — | — | — | — | 42 | 46 | 42 |
| Comparative Example | 11 | 100 | — | — | — | — | — | 37 | 43 | 37 |
| | 12 | 100 | — | — | — | — | — | 32 | 46 | 31 |
| | 13 | 100 | — | — | — | — | — | 32 | 39 | 31 |
| | 14 | 100 | — | — | — | — | — | 34 | 41 | 33 |
| | 15 | 100 | — | — | — | — | — | 38 | 40 | 39 |
| | 16 | 100 | — | — | — | — | — | 44 | 47 | 43 |

| Sample | | degree of crystallization (%) of synthetic resin difference in degree of crystallization | | nanoindenter hardness ratio | | cracking presence absence | shearing at interface presence absence | amount of abrasion (μm) |
|---|---|---|---|---|---|---|---|---|
| | | X2 − X1 | X2 − X3 | Y2/Y1 (%) | Y2/Y3 (%) | | | |
| Example of the invention | 1 | 4 | 4 | 116 | 115 | absence | absence | 10.4 |
| | 2 | 4 | 4 | 116 | 117 | absence | absence | 9.3 |
| | 3 | 4 | 4 | 116 | 117 | absence | absence | 8.0 |
| | 4 | 2 | 1 | 119 | 118 | absence | absence | 6.3 |
| | 5 | 2 | 1 | 119 | 119 | absence | absence | 6.7 |
| | 6 | 1 | 2 | 121 | 121 | absence | absence | 6.6 |
| | 7 | 1 | 1 | 125 | 126 | absence | absence | 5.9 |
| | 8 | 2 | 1 | 130 | 130 | absence | absence | 5.5 |
| | 9 | 2 | 2 | 130 | 132 | absence | absence | 4.4 |
| | 10 | 4 | 4 | 116 | 116 | absence | absence | 10.6 |

TABLE 1-continued

| | | | | | | | | |
|---|---|---|---|---|---|---|---|---|
| Comparative Example | 11 | 6 | 6 | 116 | 116 | presence | presence | 19.1 |
| | 12 | 14 | 15 | 116 | 115 | presence | presence | 21.8 |
| | 13 | 7 | 8 | 116 | 116 | presence | presence | 23.2 |
| | 14 | 7 | 8 | 131 | 132 | presence | presence | 22.4 |
| | 15 | 2 | 1 | 101 | 101 | presence | presence | 20.3 |
| | 16 | 3 | 4 | 101 | 102 | presence | presence | 22.1 |

Synthetic resin (PA66 nylon 66, POM polyacetal, or PE polyethylene) particles having an average particle size of 10 µm were used as a material of the sliding layer in Examples 1 to 10 and Comparative Examples 11 to 16. Fibrous particles (glass fibers) were used as a material in Examples 7 to 9 and had an average particle size equal to 80% of the average particle size of the synthetic resin. Solid lubricant (Gr) particles used as a material in Examples 8 and 9 had an average particle size equal to 25% of the average particle size of the synthetic resin particles. Filler ($CaF_2$) particles used as a material in Example 9 had an average particle size equal to 25% of the average particle size of the synthetic resin particles.

These materials were mixed at each ratio in Table 1. The mixture was then pressed in a pellet. The pellet was charged in a hopper and then subjected to, sequentially, a clamping, an injection and a cooling to coat the outer circumferential surface of the outer ring of the guide roller with the synthetic resin.

Producing conditions are as follows:

In Examples 1, 4 and 7 to 10, a cylinder temperature: 280° C., a mold temperature: 110° C., and a cooling time period: 70 seconds.

In Examples 2 and 5, the cylinder temperature: 185° C., the mold temperature: 100° C., and the cooling time period: 60 seconds.

In Examples 3 and 6, the cylinder temperature: 150° C., the mold temperature: 110° C., and the cooling time period: 70 seconds.

In Comparative Example 11, the cylinder temperature: 290° C., the mold temperature: 50° C., and the cooling time period: 70 seconds.

In Comparative Example 12, the cylinder temperature: 260° C., the mold temperature: 110° C., and the cooling time period: 30 seconds.

In Comparative Example 13, the cylinder temperature: 280° C., the mold temperature: 60° C., and the cooling time period: 15 seconds (conventional temperature and cooling conditions).

In Comparative Example 14, the cylinder temperature: 290° C., the mold temperature: 110° C., and the cooling time period: 15 seconds.

In Comparative Example 15, the cylinder temperature: 260° C., the mold temperature: 100° C., and the cooling time period: 15 seconds.

In Comparative Example 16, a conventional three-point gate employed, in the conditions of the cylinder temperature: 280° C., the mold temperature: 60° C., and the cooling time period: 25 seconds.

The outer ring coated with the sliding layer was assembled with the inner ring via a retainer holding a plurality of bearings such that the outer ring was rotatable, and the outer ring and the inner ring were sealed with a seal ring. Thus, the guide roller was produced. The inner ring and the outer ring of Examples 1 to 9 and Comparative Examples 11 to 14 were made of SUJ-2 and those of Example 10 were made of SUJ-3. In Examples 1 to 10 and Comparative Examples 11 to 14, the guide roller had an outer diameter of 20 mm, and the outer circumferential surface of the outer ring 5 had an outer diameter of 15 mm A width of the guide roller in an axial direction was 7 mm. The sliding layer had a thickness of 6 mm.

The degree of crystallization of the synthetic resin in each of the sliding surface side area, the intermediate area, and the interface side area was measured by the method as explained above, for the sliding layer of each of the guide rollers in Examples and Comparative Examples. The measurement results are shown in the column "degree of crystallization (%) of synthetic resin" in Table 1. A difference in the degree of crystallization between the intermediate area and the sliding surface side area and a difference in the degree of crystallization between the intermediate area and the interface side area were calculated and the results are shown in the column "difference in degree of crystallization".

Furthermore, the nanoindenter hardness of the synthetic resin in each of the sliding surface side area, the intermediate area, and the interface side area of each sliding layer was measured by the above method. The nanoindenter hardness ratio of the intermediate area to the sliding surface side area and the nanoindenter hardness ratio of the intermediate area to the interface side area were then calculated, and the results are shown in the column "nanoindenter hardness ratio" in Table 1. Please note that the "degree of crystallization of synthetic resin", the "difference in degree of crystallization" and the "nanoindenter hardness ratio" for Comparative Example 15 were measured or calculated for portions of the sliding layer other than a weld line as described above.

The sliding layer of the guide roller was sectionalized into the sliding surface side area, the intermediate area, and the interface side area as follows.

A microscope is used to cross-sectionally observe the sliding layer at an optional magnification (50- to 200-fold magnifications) to determine a thickness T of the sliding layer in a direction perpendicular to the sliding surface. A virtual line UL is drawn parallel to the sliding surface such that the line UL is positioned at a distance of 25% of the thickness T (that is, ¼*T) from a position on the sliding surface toward the outer ring. A virtual line LL is also drawn parallel to the sliding surface such that the line LL is positioned at a distance of 25% of the thickness T (that is, ¼*T) from a position of an interface between the sliding layer and the outer ring, toward the sliding surface. An area between the sliding surface and the virtual line UL is defined as the "sliding surface side area", while an area between the virtual line LL and the interface is defined as the "interface side area". An area between the virtual line UL and the virtual line LL is defined as the "intermediate area". The virtual lines UL and LL are depicted by dotted lines in FIG. 2. If the outer circumferential surface of the outer ring is uneven, the interface between the sliding layer and the outer ring is assumed as a virtual line that is parallel to the sliding surface and passes through a top portion of one of the protrusions which protrusion is closest to the sliding surface in the taken image.

Samples for measuring the degree of crystallization were collected from each of the sliding surface side area, the intermediate area, and the interface side area. A sample in an amount of 5 mg of the synthetic resin, that is necessary for the measurement, was taken, while observing the cross section of the sliding layer by the microscope or the like. As described above, the degree of crystallization of the synthetic resin was measured with the DSC and determined from the Equation (1).

Furthermore, the nanoindenter hardness was measured for each of the sliding surface side area, the intermediate area, and the interface side area, by the above-described method. The nanoindenter hardness was measured at five points in each area of the sliding layer with the nanoindenter, while observing the cross section with the microscope. Then, the nanoindenter hardness ratio was calculated, and an average value was determined.

Moreover, the guide rollers in Examples and Comparative Examples were subjected to a sliding test under conditions in Table 2. An amount of abrasion of the sliding layer through the sliding test is shown in the column "abrasion (μm)" in Table 1. A surface of the sliding layer was checked at a plurality of positions, with a roughness measurement device, whether any defects were generated through the sliding test. In the column "presence or absence of cracking" in Table 1, "presence" indicates that a defect having a depth of not less than 5 μm was measured on the surface of the sliding layer, and "absence" indicates that the defect was not measured. The sliding layer after the rotational sliding test was cut in the direction perpendicular to the sliding surface, and checked whether any shearing occurred at the interface between the sliding layer and the outer ring with an optical microscope. In the column "presence or absence of shearing in interface" in Table 1, "presence" indicates that the "shearing" was detected at the interface, and "absence" indicates that the "shearing" was not detected. In the sliding test, the guide roller was slid with the support shaft tiled at 10° as depicted in FIG. 3 of JP-A-2006-328791 (the "inclination angle" in Table 2).

TABLE 2

| testing machine | rotational sliding tester |
|---|---|
| load | 160N |
| inclination angle | 10° |
| speed | 500 mm/sec |
| drive mode | rotation in one direction |
| distance | 80 km |
| temperature | 23° C. |
| oil feeding rate | dry |
| opposed plate | SUJ2 |
| roughness of opposed plate | 0.2 Ra |

As seen from the results shown in Table 1, the amount of abrasion of the sliding layer through the sliding test of Examples 1 to 10 was smaller than that of Comparative Examples 11 to 16. Moreover, in Examples 4 to 9, the following values were both less than 3%: the difference X2–X1 between the degree of crystallization X2 of the synthetic resin in the intermediate area of the sliding layer and the degree of crystallization X1 of the synthetic resin in the sliding surface side area; and the difference X2–X3 between the degree of crystallization X2 of the synthetic resin in the intermediate area and the degree of crystallization X3 of the synthetic resin in the interface side area. Thus, amounts of abrasion of these Examples were significantly reduced. It is because deformation rate of the synthetic resin is not different between the sliding surface side area and the intermediate area when a load is applied to the sliding layer, as explained above.

Furthermore, Examples 1 to 10 were not subjected to cracking on the surface of the sliding layer and shearing at the interface. This is also due to the difference X2–X1 and the difference X2–X3 and to the ratios of Y2/Y1 and Y2/Y3 where to Y1, Y2 and Y3.

In contrast, in Comparative Examples 11 to 14, the degree of crystallization of the intermediate area of the sliding layer was higher than the degree of crystallization of the sliding surface side area and that of the interface side area. Thus, cracking occurred on the surface of the sliding layer, and shearing is likely to occur at the interface between the sliding layer and the outer ring. As a result, the sliding layer became likely to be worn, leading to an increase in the amount of abrasion.

In Comparative Example 15, substantially no difference in degree of crystallization was observed between the areas of the sliding layer, whereas the nanoindenter hardness was substantially the same in all the areas. Thus, a load applied to the sliding surface propagated to the interface between the sliding layer and the outer ring, making the interface susceptible to shearing. As a result, the sliding layer became likely to be worn, leading to an increase in the amount of abrasion.

In Comparative Example 16, the conventional three-point gate was used for the resin supply (injection), and the mold temperature and the cooling time were set to 60° C. and 25 seconds, respectively. Then, brittle weld lines were formed in the sliding layer. Thus, the weld lines may have acted as starting points of cracking in the sliding layer, leading to an increase in the amount of abrasion.

The invention claimed is:

1. A guide roller for a slide door of a vehicle, wherein the guide roller is configured to be rotatably supported by a support member attached to the slide door of the vehicle and to roll and move along a rail on a vehicle body,
wherein the guide roller comprising:
an annular metal inner ring to be attached to the support member;
a retainer holding a bearing;
an annular metal outer ring rotatably held by the inner ring via the retainer, the outer ring having an outer circumferential surface; and
a sliding layer coating on the outer circumferential surface of the outer ring, the sliding layer comprising a synthetic resin, and the sliding layer having a thickness and an outer circumferential surface serving as a sliding surface,
wherein, when the sliding layer is sectionalized into a sliding surface side area, an intermediate area and an interface side area,
the sliding surface side area being defined as an area extending from the sliding surface of the sliding layer toward an interface between the sliding layer and the outer ring and having a thickness of 25% of the sliding layer thickness;
the interface side area being defined as an area extending from the interface toward the sliding surface and having a thickness of 25% of the sliding layer thickness; and
the intermediate area is defined as an area between the sliding surface side area and the interface side area,
(a) the synthetic resin in the sliding surface side area has a degree of crystallization X1, the synthetic resin in the intermediate area has a degree of crystallization X2, and the synthetic resin in the interface side area has a degree of crystallization X3 wherein
   X2−X1 is less than 5%, and
   X2−X3 is less than 5%, and
(b) the synthetic resin in the sliding surface side area has a nanoindenter hardness Y1, the synthetic resin in the intermediate area has a nanoindenter hardness Y2, and the synthetic resin in the interface side area has a nanoindenter harness Y3 wherein
   Y2 is not less than 115% of Y1, and
   Y2 is not less than 115% of Y3.

2. The guide roller according to claim 1, wherein X1 is from 20% to less than 90%; X2 is from 20% to less than 90%; and X3 is from 20% to less than 90%.

3. The guide roller according to claim 1, wherein a value of X2−X1 is less than 3%, and a value of X2−X3 is less than 3%.

4. The guide roller according to claim 1, wherein the synthetic resin is one or more selected from a group consisting of nylon, polyacetal, polyphenylene sulfide, polyether imide and polyethylene.

5. The guide roller according to claim 1, wherein the sliding layer further comprises fibrous particles dispersed in the synthetic resin, and the fibrous particles are one or more selected from a group consisting of glass fibrous particles, ceramic fibrous particles, carbon fibrous particles, aramid fibrous particles, acrylic fibrous particles and polyvinyl alcohol fibrous particles.

6. The guide roller according to claim 1, wherein the sliding layer further comprises one or more solid lubricants selected from a group consisting of graphite, molybdenum disulfide, tungsten disulfide, boron nitride and polytetrafluoroethylene.

7. The guide roller according to claim 1, wherein the sliding layer further comprises 1 to 10 volume % of one or more fillers selected from $CaF_2$, $CaCo_3$, talc, mica, mullite, iron oxide, calcium phosphate, potassium titanate and $Mo_2C$.

8. The guide roller according to claim 1, wherein the sliding layer further comprises:
   one or more solid lubricants selected from a group consisting of graphite, molybdenum disulfide, tungsten disulfide, boron nitride and polytetrafluoroethylene, and
   1 to 10 volume % of one or more fillers selected from $CaF_2$, $CaCo_3$, talc, mica, mullite, iron oxide, calcium phosphate, potassium titanate and $Mo_2C$.

9. The guide roller according to claim 1, wherein the outer circumferential surface of the outer ring is uneven at an interface with the sliding layer.

10. The guide roller according to claim 1, wherein the outer ring comprises a flange portion protruding outward radially from the outer circumferential surface of the outer ring at an interface with the sliding layer.

* * * * *